(12) United States Patent
Roka

(10) Patent No.: US 10,405,017 B1
(45) Date of Patent: Sep. 3, 2019

(54) SECURE ACCESS TO CONTENT PROVIDED OVER A DISTRIBUTED NETWORK

(71) Applicant: Cox Communications, Inc., Atlanta, GA (US)

(72) Inventor: Pujan Roka, Alpharetta, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 15/901,096

(22) Filed: Feb. 21, 2018

Related U.S. Application Data

(60) Provisional application No. 62/540,970, filed on Aug. 3, 2017.

(51) Int. Cl.
| | |
|---|---|
| *H04N 21/254* | (2011.01) |
| *H04N 21/4627* | (2011.01) |
| *H04N 21/266* | (2011.01) |
| *H04N 21/258* | (2011.01) |

(52) U.S. Cl.
CPC ... *H04N 21/2541* (2013.01); *H04N 21/25816* (2013.01); *H04N 21/25875* (2013.01); *H04N 21/266* (2013.01); *H04N 21/4627* (2013.01)

(58) Field of Classification Search
CPC ......... H04N 21/2541; H04N 21/25816; H04N 21/25875; H04N 21/266; H04N 21/4627
See application file for complete search history.

(56) References Cited

U.S. PATENT DOCUMENTS

| | | | | |
|---|---|---|---|---|
| 7,360,248 | B1* | 4/2008 | Kanevsky | G06F 21/31 726/21 |
| 2006/0020816 | A1* | 1/2006 | Campbell | H04L 63/083 713/182 |
| 2009/0254975 | A1* | 10/2009 | Turnbull | H04L 63/0492 726/3 |
| 2011/0126296 | A1* | 5/2011 | Moore | H04L 63/0807 726/28 |
| 2011/0167440 | A1* | 7/2011 | Greenfield | H04L 63/102 725/25 |
| 2012/0185921 | A1* | 7/2012 | Wechsler | G06F 21/6245 726/4 |
| 2013/0254857 | A1* | 9/2013 | Bajenov | G06F 21/00 726/7 |
| 2018/0131982 | A1* | 5/2018 | Reynolds | H04N 21/222 |

\* cited by examiner

*Primary Examiner* — Benjamin R Bruckart
*Assistant Examiner* — Susan X Li
(74) *Attorney, Agent, or Firm* — Merchant & Gould

(57) ABSTRACT

Securing access to content provided over a distributed network is provided. A user desiring content from a given content source may provide login credentials via a downloaded content source application that will be used to authenticate the requesting user's access to the requested content item via a content services provider. When the access request is received, the content source application passes to the content services provider login/authentication credentials, location information and access attempt frequency information. If the location information and/or access attempt frequency information for the requesting user and/or user device raises suspicion that the requested access may be unauthorized, an automated notification can be passed to a primary services account holder associated with an account through which the requested content is received to request permission or denial from the primary account holder to allow the requested content access.

20 Claims, 6 Drawing Sheets

US 10,405,017 B1

SECURE ACCESS TO CONTENT PROVIDED OVER A DISTRIBUTED NETWORK

CROSS REFERENCE TO RELATED APPLICATIONS

This application claims the benefit of U.S. Provisional Application No. 62/540,970, having the title of "Validation of Login for Content Provision" and the filing date of Aug. 3, 2017, which is incorporated herein by reference in its entirety.

BACKGROUND

A technical problem associated with preventing unauthorized and/or fraudulent access to media content occurs when a service provider enables users of its respective services (e.g., cable television services, satellite television services, on-demand services) access to live or on-demand online content from content sources (e.g. channels) of which the users are subscribers. For example, video, audio, and other content sources regularly offer content such as sports, entertainment, news, weather, and the like through applications downloaded onto a variety of wired and mobile platforms. As one example, a popular sports content source may offer one or more channels or one or more individual productions of sports content via an application that can be downloaded onto a user's tablet device, smart phone, laptop computer, smart television, and the like, where subscribed-to content can be delivered from the content source over an Internet connection (wired or wireless). In a typical setting, the content source provides its content through one or more service providers such as cable-based service providers, satellite-based service providers, and the like. That is, a typical content source, such as an aforementioned sports, entertainment, news, and/or weather source, produces content which is typically distributed to users through a service provider, such as a cable-based or satellite-based service provider.

Access to streaming content from a content source typically requires users to authenticate themselves as current subscribers to the content source via an account provided by their participating service provider in order to access the content. As can be appreciated, users oftentimes find authentication processes to be frustrating and difficult. Accordingly, content sources or service providers may only require users to authenticate themselves periodically (e.g., once a year, once every 6 months). While this provides for a better user experience, it can and does leave service providers and content sources vulnerable to unauthorized and/or fraudulent access to media content. For example, a common problem that is becoming prevalent in the media content service industry is when users access content without subscribing to a service provider. This can happen when a subscriber authenticates himself/herself on a computing device that is subsequently used by a non-subscriber, when login credentials are shared with non-subscribers, when login credentials are used without their owner's knowledge, etc.

Another common problem is when users bypass regional or blackout restrictions imposed by content distributors (i.e., service providers and/or content sources) by accessing content from a location that is out-of-market with respect to the service provider responsible for providing the requested content to the user. For example, one or more requests for access to a given content item via a content source application may be received from a content requester located in an area not associated with or serviced by the content services provider. Such requests, particularly multiple requests over a given period of time, may indicate that login credentials have been misappropriated or are otherwise being used in an inappropriate or unauthorized manner for the received content requests. As can be appreciated, accessing content provided over a distributed network in an inappropriate or unauthorized manner can be considered a breach of security of the content. Further, inappropriate or unauthorized content access can negatively affect computing and network performance, for example, due to bandwidth usage of content access by unauthorized users, congesting content distributor components that receive content access requests and perform user authentication, etc. With the continually emerging threat of unauthorized access, hacking, and/or other fraudulent use or access of service provider services, a technical solution is needed to reduce or eliminate unauthorized access of content.

It is with respect to these and other considerations that the present disclosure is provided.

SUMMARY

Aspects of the present disclosure provide methods, systems, and computer readable storage devices for securing access to content in a distributed network, but are not so limited. A system of an embodiment operates to use a content source application to identify a potential misuse of credentials in a content access request received from a requesting device, and to pass a request to a content services provider to re-verify a primary account holder user associated with the content source and the content services provider through which the requested content is delivered for granting access to the requested content.

A user desiring content from a given content source can download an application from the content source onto his/her content viewing device so that he/she can request and view content from the content source via an Internet connection. Upon subsequent attempted access to a given content item via the downloaded application, the requesting user will provide login credentials via the downloaded application that will be used to authenticate the requesting user's access to the requested content item via a content services provider associated with the downloaded application for the content source. When the access request is received by the downloaded content source application, the content source application or an associated application can obtain location information for the requesting user device. In addition, the downloaded content source application or associated application can track the number of times access to the content source from the requesting user and/or from the requesting user's location is received. When login credentials are passed to the content services provider, location information and access attempt frequency information also can be passed to the content services provider. If the location information and/or access attempt frequency information for the requesting user and/or user device raises suspicion that the requested access may be unauthorized, an automated notification can be passed to a primary services account holder associated with the requested content to request permission or denial from the primary account holder to allow the requested content access.

The disclosed aspects entail an unconventional technological solution to the problem of unauthorized access, hacking, and/or other fraudulent use or access of content distribution services, and enable the benefit of technical effects that include, but are not limited to, improved computing security and increased computing and network performance. For example, aspects can be used to detect suspicious content access activity, to re-authorize service when a content application is validated, and to restrict unauthorized access to content when the application is not validated. By restricting access to content by unauthorized users, bandwidth associated with unauthorized usage is reduced, and components of the content distributors' systems are not tied up with provisioning of unauthorized content.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become apparent and better understood by reference to the following figures, wherein elements are not to scale so as to more clearly show the details and wherein like reference numbers indicate like elements throughout the several views.

DETAILED DESCRIPTION

Figure 1:
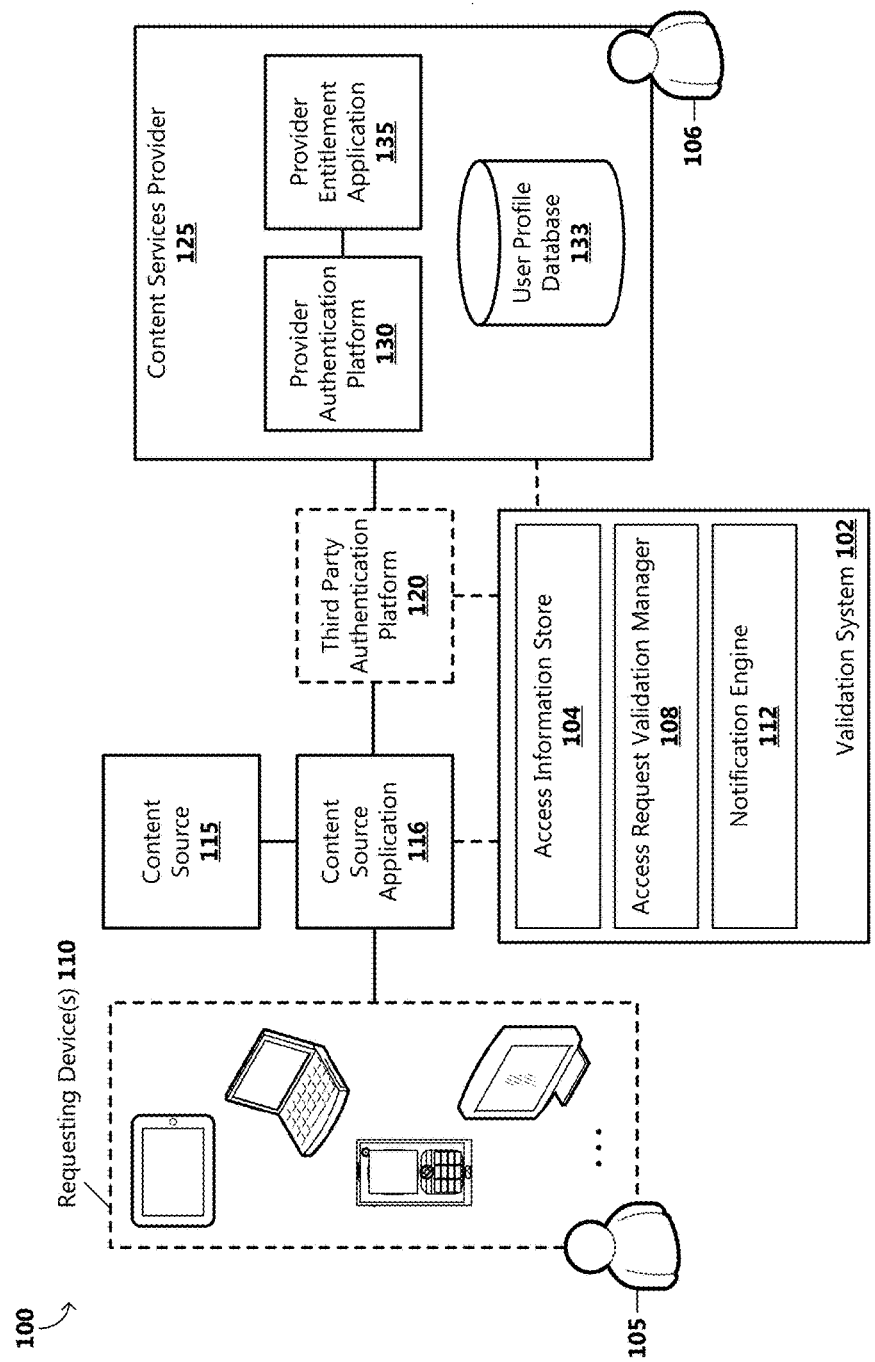
FIG. 1 is a block diagram illustrating an example operating environment and system for validation of login for content provision.

As briefly described above, aspects of the present disclosure are directed to validating login for provision of requested content. According to aspects, a user desiring content from a given source such as a sports, entertainment, weather, and/or news content source can utilize an application for the content source (e.g., content source application downloaded onto his/her content viewing device, such as a tablet, smart phone, laptop, smart television or a web application accessed via a web browser) so that he/she can request and view content from the content source via an Internet connection. When the user configures the downloaded application, the application can be associated with a given content service provider from which requested content is hosted and provided for the content source. For example, configuration of the downloaded application can associate the downloaded application with a particular cable services provider through which Internet access to content hosted by the cable services provider for the content source can be provided to a requesting user.

According to aspects, upon subsequent attempted access to a given content item via the downloaded application, the requesting user can provide login credentials through a user interface of the downloaded application, wherein the login credentials can be used to authenticate the requesting user's access to the requested content item via the content service provider associated with the downloaded application for the content source. The application passes the provided login credentials to the content services provider for authenticating the requesting user's access to the desired content item.

When an access request is received, the content source application or associated application can obtain location information for the requesting user device. In addition, the downloaded content source application or associated application can track the number of times access to the content item from the requesting user and/or from the requesting user's location is received. When login credentials are passed to the content services provider, as described above, location information and access attempt frequency information also can be passed to the services provider. If the location information and/or access attempt frequency information for the requesting user and/or user device raises suspicion that the requested access may be unauthorized, an automated notification can be passed to a primary services account holder associated with the requested content to request permission from the primary account holder to allow the requested content access.

If the requested access is authorized by the primary account holder, and if the requesting user is authenticated and entitled to access the requested content item, then the services provider will return an access permission to the content source application to allow the requesting user access to the requested content. According to some aspects, the services provider can return a time-to-live (TTL) access permission to the content source application to allow authenticated user access to the requested content during the life of the TTL access permission, for example, one hour, one day, one week, one month, one year, and the like.

FIG. 1 is a block diagram illustrating an example operating environment 100 that can be used for implementing a validation system 102 for providing login validation for content provision, as described herein, but is not so limited. Referring to FIG. 1, a pair of users 105, 106 are illustrated on the left and right sides in the environment 100. According to aspects, the user 105 represents a requesting user, that is, a user of a device 110 requesting access to a desired content item from a content source 115 via a content services provider 125, as briefly described above. The user 106 represents a primary account holder user associated with the content source 115 and the content services provider 125 through which requested content is delivered. As should be appreciated, the users 105 and 106 can be one and the same. That is, the user 105 requesting access to a given content item can be the primary account holder user 106 associated with a content services provider 125 through which content will be provided. Alternatively, the requesting user 105 can be a different user from the primary account holder user 106. For example, the requesting user 105 can be a family member, friend, business associate, or other person authorized by the primary account holder user 106 for accessing desired content via a content services account maintained by the primary content account holder user 106. Alternatively, and as will be described in further detail below, the requesting user 105 can be an unauthorized requesting user who requests access to one or more content items via a content source 115 through the account maintained by the primary account holder user 106.

Referring still to FIG. 1, the devices 110 illustrate a variety of devices on which a requesting user 105 can request and consume desired content items. The devices 110 can include tablet computing devices, smart phones, laptop computers, smart televisions, wired or wireless computing systems, set top boxes, and the like on which a content source application 116 can be downloaded or accessed via a web browser for access and provision of desired content items via a content services provider 125, as described herein. That is, the devices 110 can include any computing device capable of downloading or accessing a content source application 116 for accessing and viewing content, as described herein. Components and operation of devices 110 are described in detail below with reference to FIGS. 5, 6A, and 6B.

The content source 115 is illustrative of any content source for whom or for which an application (e.g., content source application 116) can be downloaded to the requesting user's device 110 or accessed by the requesting user's device 110 for accessing content items from the content source, as described herein. For example, the content source 115 can be a popular sports network, such as ESPN, or the content source can be a popular news service, such as CNN, ABC, CBS, NBC, FOX NEWS, and the like. Or, the content source 115 can be one or more entertainment-oriented providers, such as NETFLIX, HULU, and the like. That is, the content source 115 is illustrative of any organization or entity that can provide content to a requesting user through the user's device 110 in association with an application (e.g., content source application 116) provided by the content source that can be downloaded to the user's device 110 or can be stored on a remote server device and accessed via a web browser application on the requesting user's device 110 for accessing desired content. Components and operation of a server device is described in detail below with reference to FIG. 5. As should be appreciated, the aforementioned example content source entities are for purposes of illustration and example only and are not limiting of the vast number of content sources that can provide content items to a requesting user, as described herein.

The content source application 116 is illustrative of a software application, module, or computing device that can access content provided by a content source 115. The content source application 116 can be downloaded onto the requesting user's device 110 (e.g., via selecting and downloading an operating system-specific application through a portal, such as an online application store). For example, a popular sports content source, such as ESPN, can provide a content source application 116, such as WATCHESPN, that can be downloaded onto a requesting user's device 110 and that can be utilized for requesting Internet-based content from the content source, for example, ESPN, through the application. Alternatively, the content source application 116 can be a web application that resides on a web server and is configured to receive requests from a web browser application executing on the user's device 110, execute application logic, and generate a user interface for rendering on the user's device via the web browser application.

According to aspects, when a user first downloads or accesses the content source application 116, the application can be configured to allow the user one-time, frequent, periodic, or other access to content provided by the associated content source 115. During such configuration, payment information can be provided by the requesting user, for example, credit card information, and login/authentication credentials can be set up, for example, establishment of a username and password that will be used by a requesting user 105 upon subsequent attempted access to content of the content source 115 through the content source application 116. In some examples, authentication credentials may be requested for each subsequent attempted access to content through the content source application 116. In other examples, once a requesting user's authentication credentials are authenticated and the user's entitlements are determined, the content services provider 125 can allow authenticated user access to content of the content source 115 for a specific period of time (e.g., 1 day, 1 week, 1 month, 1 year) without requiring the requesting user to re-enter login/authentication credentials.

During such a configuration, the requesting user 105 will typically select a desired content services provider 125 at which content provided by the content source 115 is hosted and through which hosted content is delivered to one or more requesting devices 110. During this phase of configuration, the requesting user 105 typically selects a desired content services provider 125 and provides previously established login/authentication credentials for accessing the content services provider. For example, if the content services provider 125 is a cable services provider or satellite services provider, for example, COX COMMUNICATIONS, COMCAST CABLE COMMUNICATIONS, CHARTER SPECTRUM, DIRECT TV, and the like, then during configuration of the content source application 116, the requesting user 105 will not only select the content services provider 125 through which he/she receives content, but will also provide the application with login credentials/authentication information associated with his/her account (e.g., for which the requesting user 105 may or may not be the primary content account holder user 106) with the selected content services provider 125.

According to aspects of the present disclosure, the content source application 116 can include one or more components of the validation system 102 or be in communication with the validation system, which is illustrative of a software application, module, or computing device that can perform monitoring and tracking functions with respect to requested access to content items by a requesting user 105. While a variety of operational components are described with respect to the validation system 102, it will be appreciated that additional or fewer components may be employed and/or components and associated functionalities can be distributed throughout the operating environment 100. For example, one or more functionalities of the validation system 102 can be performed by the content source application 116, the third party authentication platform 120, or by one or more components of the content services provider 125 backend equipment. That is, one or more components of the validation system 102 can be stored on and execute on one or a combination of the requesting device 110, a web server, a third party authentication platform 120 computing device, and the content services provider 125 backend server computing device.

According to one aspect, each time a requesting user 105 requests access to a content item from a content source 115, the validation system 102 is operative to determine a location of the requesting user 105 and to track the frequency of the requesting user's attempted access to one or more content items. In various implementations, the content source application 116 is operative or configured to obtain location information through a variety of means, and to transmit this location information to the validation system 102. For example, an Internet Protocol (IP) address associated with the requesting user's device 110 can be utilized for determining the location of the requesting user 105. For another example, location information of a wireless access point or other wireless connection point through which the requesting user's device 110 is accessing an Internet connection can be utilized for determining location. For another example, global positioning satellite (GPS) location information or any other suitable location determining system or application associated with the requesting user's device 110 can be queried by the content source application 116 each time a request for access to a given content source 115 via the application is received by a requesting user 105. As will be described below, location information for the requesting user's device 110 can be used for determining whether the requesting user's device 110 is being utilized for requesting access to content in an unauthorized or otherwise inappropriate manner.

In addition, the validation system 102 can also track and monitor the frequency of content access attempts from the requesting user's device 110. That is, each time the requesting user 105 attempts access to a given content source 115 via the content source application 116, the attempted access can be logged by the application so that the validation system 102 can have access to access attempt frequency information in addition to access attempt location information, as described above. As described below, access attempt frequency and location information can be utilized for determining whether attempted access may be unauthorized or otherwise inappropriate.

Referring still to FIG. 1, the third party authentication platform 120 is illustrative of a brokering application or service through which the content source 115 can pass requests for access to hosted and/or deliverable content from a content services provider 125. An example of a third party authentication platform 120 is ADOBE PRIMETIME AUTHENTICATION. According to aspects, each time a request for access to a given content item is received from a requesting user 105 through a content source application 116, login and/or authentication credentials associated with the access request can be passed through the third party authentication platform 120, which will in turn pass the information to an appropriate content services provider 125, as described below. As should be appreciated, according to alternative aspects, the third party authentication platform 120 may not be utilized, and requests for content along with login and/or authentication information, as described above, are passed directly from the content source application 116 to the content services provider 125, as described below.

According to alternative aspects, the functionality of the validation system 102 used for monitoring and tracking attempted user access, for example, monitoring and tracking requesting user device location and access request frequency, can be performed at the third party authentication platform 120 or at the content services provider 125, described below. That is, according to aspects, the content source application 116 can provide a simple interface between the requesting user device 110 and content hosted for and delivered for the content source 115 by a content services provider 125, and monitoring and tracking information associated with attempted content access can be provided by the validation system 102 at or through the third party authentication platform 120 or content services provider 125, as described below.

Referring still to FIG. 1, the content services provider 125 is illustrative of a content services provider such as a cable services provider or satellite services provider, for example, COX COMMUNICATIONS, COMCAST CABLE COMMUNICATIONS, CHARTER SPECTRUM, DIRECT TV, and the like. According to aspects, such content services providers 125 can host and deliver content on behalf of a variety of content sources 115, as described above through a variety of mechanisms. For example, such content services providers 125 can provide content from content sources 115 through hardwired cable systems or satellite receivers providing the content to a premises via a cable connected to a premises location or via a satellite signal receiver located at or connected to a premises location. Alternatively, and according to aspects of the present disclosure, such content services providers 125 can host and provide content of a given content source 115 to a requesting user 105 via an Internet connection associated with the requesting user's device 110.

For example, the popular sports and entertainment network, ESPN, can commission a content services provider 125, such as those described above, to host and deliver its content, for example, popular sports shows, to requesting devices 110 via a variety of mechanisms. According to aspects of the present disclosure, such hosted and delivered content of the content source 115 is provided by the content services providers 125 via an Internet connection through the content source application 116 to the requesting user's device 110. As an example, after the requesting user 105 downloads a given content source application 116, for example, WATCH ESPN, the user can then access content from a particular content source 115 through the downloaded application, wherein the downloaded application serves as a web service or web interface to the hosted content hosted and provided by the content services provider 125. As another example, the requesting user 105 can use a web browser to access a given web content source application 116, for example, WATCHESPN. The user can then access content from a particular content source 115 through the web application, wherein the web application serves as a web service or web interface to the hosted content hosted and provided by the content services provider 125.

Referring still to the content services provider 125, a provider authentication platform 130 is illustrative of a software application, module or computing device operated by the content services provider 125 for receiving user login and/or authentication information via the content source application 116 and for determining whether the requesting user 105 can access content provided by the content services provider 125. According to one aspect, when a requesting user 105 logs into the content source application 116 (e.g., enters a username and password), a request is sent from the content source application, optionally through a third party authentication platform 120, to the provider authentication platform 130 at the content services provider 125. For example, the request can be in the form of a structured document, such as an Extensible Markup Language (XML) document, that can provide the provider authentication platform the user login and/or authentication information. In some examples, the request further includes a particular content source 115 and/or content item that the requesting user 105 is attempting to access. The provider authentication platform 130 is configured to perform an authentication verification, for example, to check the user login and/or authentication information against an existing login-password validity record to determine whether the user login and/or authentication information is valid in association with a subscriber account. If so, the requesting user 105 is authenticated.

The provider entitlement application 135 is illustrative of the software application, module or computing device operative for determining content that users are entitled or authorized to access based on the user's subscription to content from the content source 115. When a request includes an indication of a particular content item requested by the requesting user 105 (e.g., when the requesting user 105 selects a particular content item to access), the provider entitlement application 135 is configured to determine whether the requesting user is entitled or authorized to access the requested content item. For example, a given content source 115, for example, ESPN, can provide a number of content items via the content source application 116 and the content services provider 125. A given requesting user 105, however, may only have access to a portion of the offerings of the content source 115. Thus, when a requesting user 105 requests access to a given content item, in addition to determining whether the requesting user can access content via the content services provider 125, the provider entitlement application 135 can be utilized for determining whether the requesting user has subscribed to and is authorized to access the specific requested content item. According to an aspect, the provider authentication platform 130 and the provider entitlement application 135 are operative to access one or more databases, such as a user profile database 133 that stores user profile data and account details associated with subscribers' accounts, for checking whether a requesting user 105 is subscribed to and is authorized to access the specific requested content item.

Subsequent to determining whether the requesting user 105 is subscribed to and is authorized to access the requested content item, the content services provider 125 is operative or configured to transmit a responsive communication to the content source application 116 for informing the application whether access is allowed or denied. For example, access may be denied because of unacceptable login/authentication credentials or because of lack of entitlement to the requested content item. According to one aspect, the notification sent from the content services provider 125 back to the content source application 116 can be in the form of a structured document, for example, a document structured according to a structuring language such as the Extensible Markup Language (XML) that can provide the content source application 116 information associated with the denied (or allowed access). In some examples, the content source application 116 stores authorization information so that subsequent requests for access to content of a given content source 115 via the content source application 116 can cause delivery of the content from the content services provider 125 without requesting login/authentication for the content services provider each time requested access to a content item is received. Information associated with allowed access can include time-to-live (TTL) access permission information that enables the content source application 116 to allow authenticated user access to the requested content during the life of the TTL access permission, for example, one hour, one day, one week, one month, one year, and the like. Details of example content service providers 125 for hosting and delivering content, as described herein, are provided below with respect to FIGS. 3 and 4.

According to an aspect, the content source application 116 is operative or configured to retrieve geolocation information for the requesting user's device 110, as described above. For example, when a requesting user 105 makes a selection to access a content item via the content source application 116, the content source application can request location information from one or a combination of location information sources associated with the requesting user's device 110. In some examples, the requesting user's device 110 includes a GPS chip that uses satellite data to calculate the position of the device, which can be communicated to the content source application 116. In other examples, the content source application 116 can receive location information from a geolocation application that uses cell towers to triangulate an approximate position of the requesting user's device 110. In other examples, the content source application 116 can request the requesting user's device 110 for information associated with a wireless access point or other Internet services access point for determining the location of the requesting user's device. In other examples, the IP address of the requesting user's device 110 is used for determining location information. As should be appreciated, any of a number of available means for determining an exact or generalized location of the requesting user's device 110 can be utilized to provide location information to the validation system 102. According to an aspect, this location information is stored in an access information store 104.

In addition, the content source application 116 is operative or configured to obtain access attempt information for beginning or incrementing a count associated with access attempts from the requesting user's device 110 for this content source 115 or for any other content item. This access attempt count can also be stored in the access information store 104. The validation system 102 can track the number of times the requesting user's device 110 has requested access to content via the content source application 116 from the present location of the requesting user's device, wherein "present location" can include a specific location (e.g., geolocation) or a generalized location (e.g., Dallas, Tex., Atlanta metropolitan area). For example, if the requesting user 105 is requesting access, and the user's device 110 is located in Dallas, Tex., then information indicating that location for the requesting user's device will be obtained, as described above. In addition, if this is the first request from the requesting user's device 110 from that location, then that information showing that this is the first request will be stored. If this is the second, third, or $n^{th}$ request from the requesting user's device 110 from this location, that information is tracked and stored.

According to an aspect, the location and frequency of attempted accesses information can indicate that attempted access to various content items is coming from various and/or multiple locations or from a location that is outside of the content service provider's contractual market area. Accordingly, this can further indicate that the login/authentication credentials associated with the primary account holder user 106 or other authorized user have somehow been misappropriated or are otherwise being utilized in an unauthorized or inappropriate manner. That is, if attempts to access content items through the content source application 116 and the content services provider 125 indicate that attempts to access the content are coming from devices 110 located at various locations, including locations in which the content services provider 125 does not regularly operate, a determination can be made that the attempts to access content items through this user device or in association with the presently in-use login/authentication credentials are not appropriate or are otherwise suspicious. This analysis is particularly important where it may appear that multiple users are attempting to access content via a single account associated with the primary account holder user 106, which can indicate that the login/authentication credentials associated with the account have been compromised (e.g., hacked) or otherwise misappropriated.

According to an aspect, the validation system 102 comprises an access request validation manager 108 operative or configured to analyze location and frequency of attempted accesses information (associated with a current request and past requests associated with the login/authentication credentials) for determining whether the current content access request is suspicious. That is, when access to content is requested via the content source application 116, the validation system 102 is operative or configured to access the location and frequency of attempted accesses information for making a determination as to whether the location and/or frequency of attempted accesses information satisfies predetermined criteria associated with suspicious content access activity. For example, the predetermined criteria associated with suspicious content access activity can include a threshold (e.g., one or more) of content access requests from a location that is out-of-market for the content services provider 125. In some examples, the threshold is temporal-dependent (e.g., n content access requests from z location within x days, n content access requests over x days/weeks outside of z market area). According to an aspect, the predetermined criteria and thresholds associated with suspicious content access activity can be configurable by the content services provider 125 or by the content source 115. In some implementations, when access to content is requested via the content source application 116, the content source application 116 passes the location and frequency of attempted accesses information to the validation system 102 for determining whether the current content access request is suspicious.

If the geolocation and frequency of access indicates a suspicious request for accessing content (e.g., the location and/or frequency of attempted accesses information satisfies predetermined criteria associated with suspicious content access activity), an indication of this suspicion is passed to a notification engine 112, which is operative or configured to query the user profile database 133 to obtain contact information for the primary account holder user 106 associated with the content access request and to generate and transmit a notification communication to the primary account holder. According to aspects, that notification communication can be sent via one or more communication channels. For example, the notification engine 112 is operative or configured to generate and send a notification communication in the form of an electronic mail, an SMS message, an instant message, a text message, a telephone call, and the like.

In various implementations, the notification communication includes a notification of the requesting user's content access request and a response request. That is, the primary account holder user 106 is provided an opportunity to reply to the received notification communication to indicate whether the requested access is appropriate. For example, the notification communication can include a user interface or other appropriate and suitable means for allowing the primary account holder user to reply to the mail, message, call, or other communication that the requested access is either approved or denied. For example, if the primary account holder user's child, spouse, business associate, or other persons are known and authorized to request and receive information at the requesting location and according to the requested frequency of requests, the primary account holder user 106 can simply reply back that the attempted access to the content item is approved. Otherwise, if the primary account holder user 106 does not recognize information provided in the notification and does not approve of the requested content delivery, then the primary account holder user 106 can reply back that the requested access is denied.

According to an aspect, the notification engine 112 is further operative or configured to receive a response from the primary account holder user 106 and to notify the provider authentication platform 130 of whether the access request is approved or denied by the primary account holder user. For example, if the primary account holder user 106 approves of the requested content access, then a notification of the approval is communicated to the provider authentication platform, such that the requested access can be approved by the content services provider 125. The approval of the access by the content services provider 125 can be in the form of a structured message or access token that passes approval information back to the content source application 116 for notifying the application that the requested content access is approved. As described above, the notification can include a time-to-live (TTL) notification that indicates to the content source application 116 that the authorized access by the requesting user device 110 can be valid for a given period of time, for example, one day, one week, one month, one year, and the like. As should be appreciated by those skilled in the art, subsequent requests for the requested content during the lifetime of the TTL period can be automatically approved by the content source application 116 without additional authentication or entitlement requirements from the content services provider 125. As another example, if the primary account holder user 106 denies approval of the requested content access, then a notification of the denial is communicated to the provider authentication platform, such that the requested access can be denied by the content services provider 125.

According to another aspect, if the content source application 116 has cached user login/authentication credentials of the requesting user 105 for a period of time and if characteristics (e.g., location, number of access attempts within a predetermined time period from an identified location) of a current content access request received via the content source application from a requesting device 110 satisfy predetermined criteria associated with suspicious content access activity (e.g., as determined by the access request validation manager 108), the access request validation manager will initiate a notification communication to the primary account holder user 106 that the content source application 116 is being used by the requesting user 105. At that point, the primary account holder user 106 can be required to acknowledge that activity by responding to the notification communication, by entering the secret code or PIN, etc. A grace period of X days can be provided for this approval (to avoid disruption of service for the requesting user 105). Otherwise, the requesting user 105 can be forced out of the cached login and forced to login again.

Figure 2:
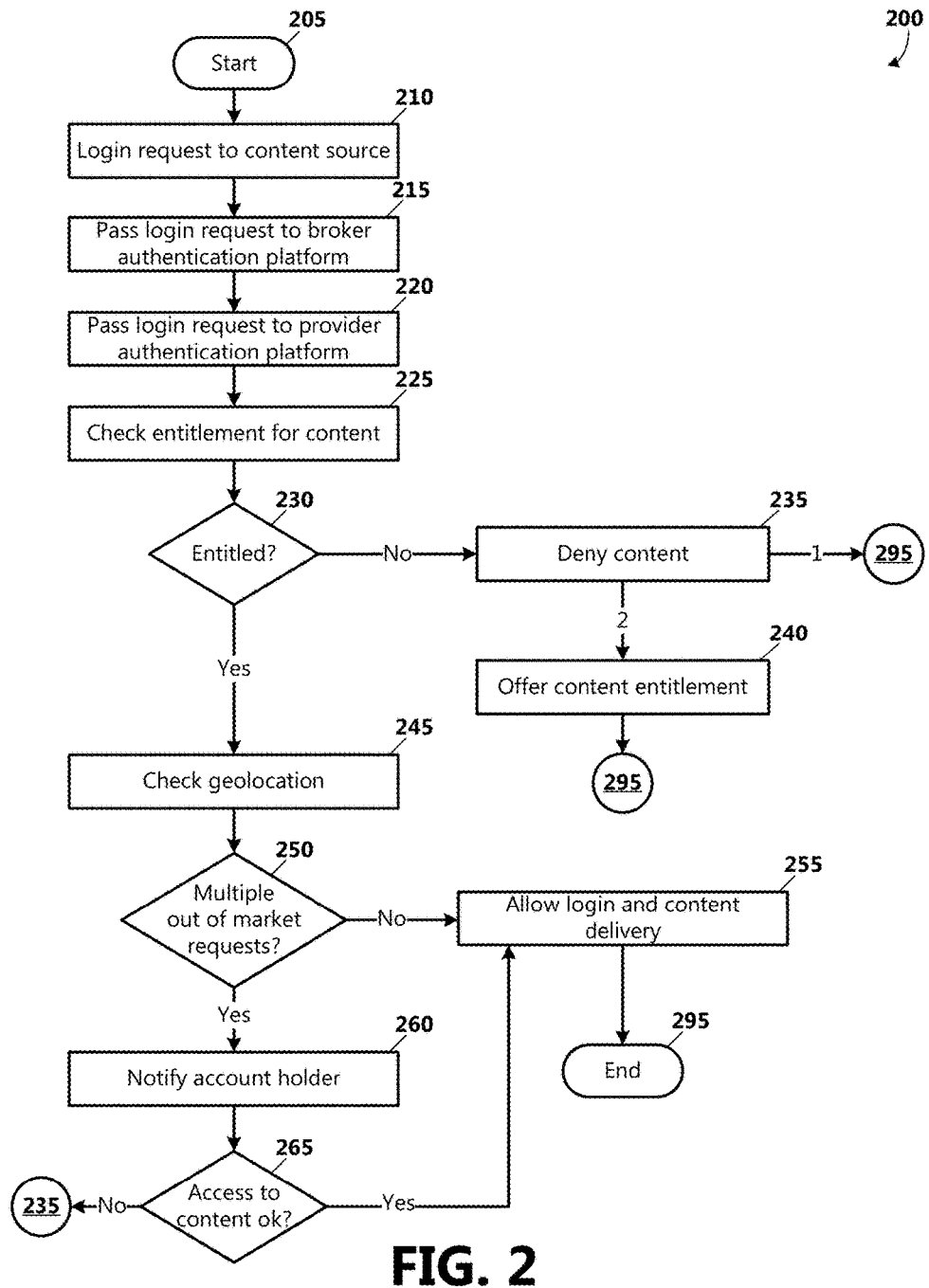
FIG. 2 is a flow diagram depicting general stages of an example process for validation of login for content provision.

Having described an example operating environment 100 for aspects of the present disclosure with respect to FIG. 1 above, FIG. 2 is a flow diagram depicting general stages of an example process for validation of login for content provision. For purposes of description of the example process flow illustrated in FIG. 2, consider an example use case where a requesting user 105 is requesting access to a particular content item, for example, a sports show via a content source 115, for example, ESPN, where the content of the example content source is hosted and delivered via the content source application 116 by a content services provider 125, for example, COX COMMUNICATIONS or COMCAST. Referring then to FIG. 2, the method 200 begins at start operation 205 and proceeds to operation 210 where a requesting user 105 launches a content source application 116 on his/her device 110 for viewing a desired content item, such as the example sports show mentioned above.

At operation 210, upon launching the content source application 116 and selecting a desired content source item, for example, a particular sports show that may be one of many example sports shows provided by the example sports content source 115, the requesting user 105 can be required to enter login credentials, for example, a username and/or password. Alternatively, if the requesting user 105 has previously entered such login/authentication credentials and has saved those credentials, then the credentials can be automatically retrieved from storage. In either case, the entered login/authentication credentials and/or stored login/authentication credentials are passed to the third party (broker) authentication platform 120 at operation 215. Alternatively, as described above, if the third party (broker) authentication platform 120 is not utilized, where requests made through the content source application 116 are passed directly to the content services provider 125, then the method proceeds directly to operation 220.

After the requesting user 105 enters login/authentication information, the content source application 116 retrieves geolocation information for the requesting user's device 110, as described above. For example, the content source application 116 can analyze an IP address associated with the incoming request, can query a GPS location information source associated with the requesting user's device 110, or can query the user's device for information associated with a wireless access point or other Internet services access point for determining the location of the requesting user's device. As described above and as should be appreciated, any of a number of available means for determining the location of the requesting user's device 110 can be accessed and utilized by the content source application 116 for determining geo-location of the requesting user's device. This location information is then passed to the validation system 102. In addition, at this operation, the validation system 102 can begin or increment a count associated with access attempts from the requesting user's device 110 for this content source 115 or for any other content item. That is, at this operation, the validation system 102 can track the number of times the requesting user's device 110 has requested access to content via the content source application 116 from the present location of the requesting user's device. For example, if the requesting user 105 is requesting access, and the user's device 110 is located in Dallas, Tex., then information indicating that location for the requesting user's device will be obtained, as described above. In addition, if this is the first request from the requesting user's device 110 from that location, then that information showing that this is the first request will be stored. If this is the second, third or n$^{th}$ request from the requesting user's device 110 from this location, that information will be tracked and stored. In some implementations, when the requesting user's login credentials information is passed from the content source application 116 to the content services provider 125, information indicating the location of the requesting user's device 110 and information indicating the frequency of requests from the requesting user's device from the associated location will similarly be passed to the content services provider 125.

At operation 220, login/authentication credentials entered by the requesting user 105 or retrieved for the requesting user at operation 210 are passed to the content services provider 125 and then to the provider authentication platform 130, as illustrated in FIG. 1. At this operation, the provider authentication platform 130 can check the received login/authentication credentials against a user profile 133 maintained and associated with the requesting user 105 to determine whether the received login/authentication credentials are correct and can be used for authenticating the requested access to the content item. At operation 225, the content services provider 125 checks the provider entitlement application 135 to determine whether the requesting user 105 is also authorized to access and receive the requested content item. For example, the requesting user 105 may have subscribed to services of the example sports content source, but the viewing package or program subscribed to by the requesting user may not allow access to the specific content item requested by the requesting user 105. Thus, at operation 225, in addition to verifying login/authentication credentials for allowing the user access to the systems of the content services provider 125 for receiving content, a determination must be made as to whether the user is, in fact, entitled to receive the particular content item that has been requested.

Referring still to FIG. 2, at operation 230, a determination is made, as described above, as to whether the requesting user 105 is entitled to access the requested content item. As described above, this determination includes a determination of whether the user's login/authentication credentials allow the requesting user 105 access to content from the content services provider 125 and whether the requesting user is entitled to access the specific requested content item. If, in either case, the requesting user 105 may not receive the desired content item, then the method 200 proceeds to operation 235 and access to the content is denied. In such a case, a responsive communication can be passed from the content services provider 125 back to the content source application 116 for notifying the requesting user 105 that access is either denied because of unacceptable login/authentication credentials or because of lack of entitlement to the requested content item. According to one aspect, the notification sent from the content services provider 125 back to the content source application 116 can be in the form of a structured document, for example, a document structured according to a structuring language such as the Extensible Markup Language (XML) that can provide the content source application 116 information associated with the denied (or allowed access).

If the access is denied because of inappropriate or missing or erroneous login/authentication credentials, the requesting user 105 can be requested to provide updated or different login/authentication credentials for allowing the process to start again at operation 210, or alternatively, the process can end at operation 295. Alternatively, if the requesting user's login/authentication credentials are appropriate such that the requesting user 105 can access the services of the content services provider 125, but the requesting user is not entitled to access the specifically requested content item, the process can proceed to operation 240, and the communication sent back to the content source application 116 can notify the requesting user 105 that the user can gain access to the requested content item by paying an additional amount, changing the user's current subscription, or the like. As should be appreciated, if the requesting user 105 does pay for the additional content, or changes the user's current subscription package or program, such information can be passed by the content source application 116 back to the content services provider 125 for updating the requesting user's profile and for ultimately allowing the requesting user 105 to access the desired specific content item. As should be appreciated, the requesting user 105 can be redirected by the content source application 116 to a website or other interface operated by the content services provider 125 for effecting a purchase of the specifically requested content item or for effecting changes to the requesting user's current services subscription.

Referring back to operation 230, if the requesting user's access is allowed based on the requesting user's login/authentication credentials, and if the requesting user 105 is entitled to the specifically requested content item, the method 200 proceeds to operation 245 where the geolocation information is analyzed by the access request validation manager 108 to determine whether the location of the requesting user device 110 is in a location that may be inappropriate for allowing access to the requested content by the requesting user 105. At operation 250, a determination is made as to whether the requested access represents a request or multiple requests from a location that is either out-of-market with respect to the content services provider 125 or represents a request from multiple locations that may be in the market of the content services provider 125. For example, if the requested access is coming from a user device 110 that is presently in a location not serviced by the content services provider 125, that information can be utilized by the content services provider 125 to determine that the user device or the user login/authentication credentials may be in use or operation by an unauthorized user, where the user device has been stolen or otherwise misappropriated, or where the user device 110 has been transported to a location not associated with the content services provider 125, or where access to the content services are being utilized by unauthorized persons.

As another example, the location and frequency of attempted accesses can indicate that attempted access to various content items, as described above, is coming from various and/or multiple locations that can indicate that the login/authentication credentials associated with the primary account holder user 106 or other authorized user have somehow been misappropriated or are otherwise being utilized in an unauthorized or inappropriate manner. That is, if attempts to access content items through the content source application 116 and the content services provider 125 indicate that attempts to access the content are coming from devices 110 located at various locations, including locations in which the content services provider 125 does not regularly operate, a determination can be made that the attempts to access content items through this user device or in association with the presently in-use login/authentication credentials are not appropriate or are otherwise suspicious. As mentioned above, this analysis is particularly important where it may appear that multiple users are attempting to access content via a single account associated with the primary account holder user 106, which can indicate that the login/authentication credentials associated with the account have been compromised (e.g., hacked) or otherwise misappropriated. If the geolocation and frequency of access does not indicate a suspicious request for accessing content, the method 200 can proceed to operation 255 and login and content delivery as requested can be effected, as described below.

Referring back to operation 250, if the geolocation and/or frequency of content request attempts is determined by the access request validation manager 108 to be suspicious, the method 200 proceeds to operation 260, and a notification is sent to the primary account holder 106. That is, instead of a notification being sent back to the requesting user 105, at operation 260, a notification is sent directly to the primary account holder user 106 associated with the requested content. According to aspects, that notification communication can be sent as an electronic mail, an SMS message, an instant message, a text message, a telephone call, and the like.

At operation 265, a determination is made as to whether access to the requested content is acceptable by the primary account holder user 106. That is, in response to a notification communication being sent to the primary account holder user 106, the primary account holder user 106 can be provided an opportunity to reply to the received notification communication to indicate whether the requested access is appropriate. If access to the requested content is denied, the method 200 can proceed back to operation 235 where a notification or instruction can be passed back to the requesting user 105 (via the content source application 116) that access is denied, as described above.

If, at operation 265, the primary account holder user 106 approves of the requested content access, then the method 200 proceeds to operation 255, and the requested access is approved by the content services provider 125. As described above, the approval of the access can be in the form of a structured message or an access token that passes approval information or an instruction back to the content source application 116 for notifying the application that the requested content access is approved. As described above, the notification can include a TTL notification that indicates to the content source application 116 that the authorized access by the requesting user device 110 can be valid for a given period of time, for example, one day, one week, one month, one year, and the like. As should be appreciated by those skilled in the art, subsequent requests for the requested content during the lifetime of the TTL period can be automatically approved by the content source application 116 without additional authentication or entitlement requirements from the content services provider 125. The method 200 ends at operation 295.

According to another aspect, when the requesting user 105 first attempts to login at operation 210, if the login/authentications credentials passed to the provider authentication platform 130 are found to belong to the primary account holder user 106, then the requesting user 105 can receive a notification from the validation system 102 via the content source application 116 that requires the requesting user 105 to enter a secret code or personal identification number (PIN) that can reside in a billing system, personal profile, or the like of the services provider 125. In addition, such a login attempt will prompt the requesting user 105 that the primary account holder user 106 is being asked to authorize the login if the requesting user is not the primary account holder but is requesting content via a child or associated account of the primary account holder. In parallel, the primary account holder user 106 will get a notification that another user (with XYZ user credentials, username, email, etc.) is attempting to login. If the primary account holder user 106 recognizes the attempted login, he or she can be required to enter the secret code or PIN, which will approve the login for the other user (i.e., requesting user 105).

According to another aspect, if the content source application 116 has cached user login/authentication credentials of the requesting user 105 for an extended period of time, and the requesting user continues to use the content source application 116 regularly, any IP traffic within an interval of X days, for example 5 days, will initiate a notification to the primary account holder user 106 that the content source application 116 is being used by the requesting user 105. At that point, the primary account holder user 106 can be required to acknowledge that activity by entering the secret code or PIN. A grace period of X days can be provided for this approval (to avoid disruption of service for the requesting user 105). Otherwise, the requesting user 105 can be forced out of the cached login and forced to login again, as described above.

As described above with reference to FIG. 1, all of the functionality described with reference to the validation system 102 can be operated as a stand alone application, or that functionality can be operated at the content source application associated with the content source 115, at the third party authentication platform 120, at the content services provider 125, or a combination of the above.

Figure 3:
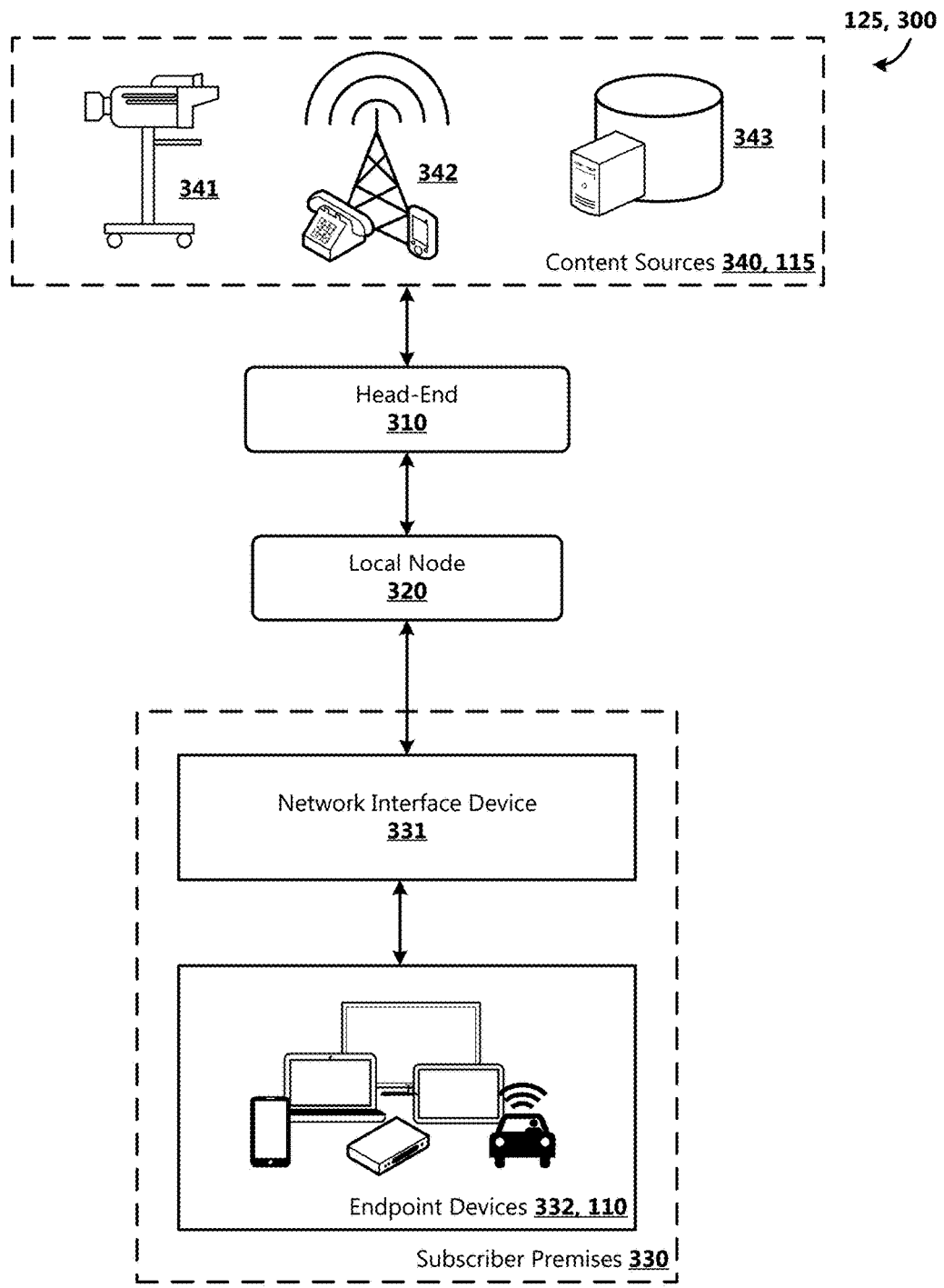
FIG. 3 is a block diagram illustrating an example content delivery system through which requested content can be hosted and/or delivered to a requesting user.

FIG. 3 illustrates an example Content Delivery Network (CDN) 300 with which the present disclosure can be practiced. According to aspects the content services provider 125 can operate in the form of a CDN 300 as illustrated and described in FIG. 3. Services originate at a head-end 310, which distributes services to local nodes 320, which in turn serve subscriber premises 330. The CDN 300 provides tiers of caching and processing from which data are requested and transmitted over a physical network (which can include wired and wireless components), enabling the distribution of data and services for quick access by consumers at lower levels of the tier from higher levels of the tier where the content originates. Content can remain cached at a given tier in the CDN 300 according to a Time to Live (TTL) value associated with the content and/or the tier (e.g., 6, 12, 24 hours), such that the content will expire according to the TTL value so that the CDN 300 can reclaim the memory used to cache the expired content item to cache a different content item. Services include, but are not limited to cable television service, Internet service, and telephone service, and one consumer can be provided with one or more services by the content services provider 125 over the CDN 300. According to aspects of the present disclosure, the provider authentication platform 130 and the provider entitlement application 135 can be operated in a backend of the CDN system and the services of those platforms and applications can be distributed via the head-end 310. In some implementations, one or more components of the validation system 102 can be operated in a backend of the CDN system.

The CDN 300 illustrated in FIG. 3 in various aspects uses an HFC network as its physical network to link subscriber premises 330 with content sources 115,340 to provide content. The head-end 310 is in communication with the local node 320 via fiber optic cables, and the local node 320 is in communication with the subscriber premises 330 via fiber optic cables (when fiber to the premises (FTTP) is installed), coaxial cables, or telephone lines. Because subscriber premises 330 are typically wired with coaxial cable, even an FTTP network can be considered an HFC network.

In other aspects, the head-end 310 can be in communication with the content sources 340 via various transmission media, including, but not limited to, fiber optic cables, coaxial cables, telephone lines, and radio waves. Content sources 340 include television stations 341, telephone networks 342, and content servers 343, as well, as the content sources 115, described above with reference to FIG. 1. Television stations 341 include local broadcast stations, cable network stations, and satellite network stations. Telephone networks 342 include wireless networks, such as mobile phone cells in a cellular telephone network, as well as wired networks, such the trunk lines between cell towers and/or telephone exchanges. Content servers 343 include local content servers, such as the servers used by the service provider to store and provide VOD content, and remote content servers, such as those provided via the Internet or by other service providers.

Although, for purposes of simplicity, only one local node 320 and one subscriber premises 330 are illustrated in FIG. 3, one of ordinary skill in the art will understand that a head-end 310 can be in communication with multiple local nodes 320 and each local node 320 can be in communication with multiple subscriber premises 330. One of ordinary skill in the art will also recognize that a head-end 310 can be implemented in a single office or facility, or in a ring of multiple offices or facilities that act as distributed hubs of the head-end 310, which can be in communication with each other via fiber optic cables or radio waves, such as, for example, microwave transmissions.

At the subscriber premises 330, services are received from the local node 320 by network interface devices 331, such as, for example, cable modems, set top boxes (STB), cable cards, and Voice over Internet Protocol (VoIP) telephone interfaces. A network interface device 331 interfaces between the local node 320 and endpoint devices 332, and can convert signals comprising the services from one transmission medium to another transmission medium (e.g., between coaxial cable, Ethernet cable (category-6, category-6e, etc.), telephone cable (RJ11, RJ14, etc.), and radio waves), translate signals between encapsulation modes (e.g., shift signals to heterodynes, change signal standards, change modulation schemes), cache or buffer data for burst transmission, apply forward error correction, and route signals to the appropriate endpoint devices 332.

Endpoint devices 332 (including the devices 110 illustrated and described with respect to FIG. 1) are devices used by consumers to consume content delivered over the CDN 300, such as, for example, televisions, Digital Video Recorders (DVR), computers (including desktops, laptops, tablets, netbooks, personal media servers, video game systems, etc.), landline phones (including VoIP and Plain Old Telephone Service (POTS) consoles), mobile phones, fax machines, networked printers, Internet radios receivers, etc. In various aspects, endpoint devices 332 can incorporate interface devices 331, such as, for example, a combination STB and DVR.

As one of ordinary skill in the art will understand, the CDN 300 will include various computer devices, which are used to manage and control how content is cached for the provision of services to consumers. For example, when a consumer requests a content item, the CDN 300 will check for the content item in the cache of the node lowest in the tier (and closest to the consumer) and will check progressively higher in the tiers (up to an origin content store) for a cached version of that content item until it is retrieved and distributed through the tiers of the CDN 300 and the consumer. Computers used in the CDN 300 include processors and memory storage devices, which store instructions that when executed by the processors enable the caching and retrieval of content for the provision of services. Memory storage devices are articles of manufacture that include computer-readable storage media. The term computer-readable storage media does not include transmission media, but refers to hardware media used to store desired information for access by a computer. Examples of computer-readable storage media include, but are not limited to, RAM, ROM, EPROM, EEPROM, solid-state memory, such as flash memory, optical storage, such as CD-ROMs and DVDs, and magnetic storage devices, such as magnetic tape and magnetic disks.

Figure 4:
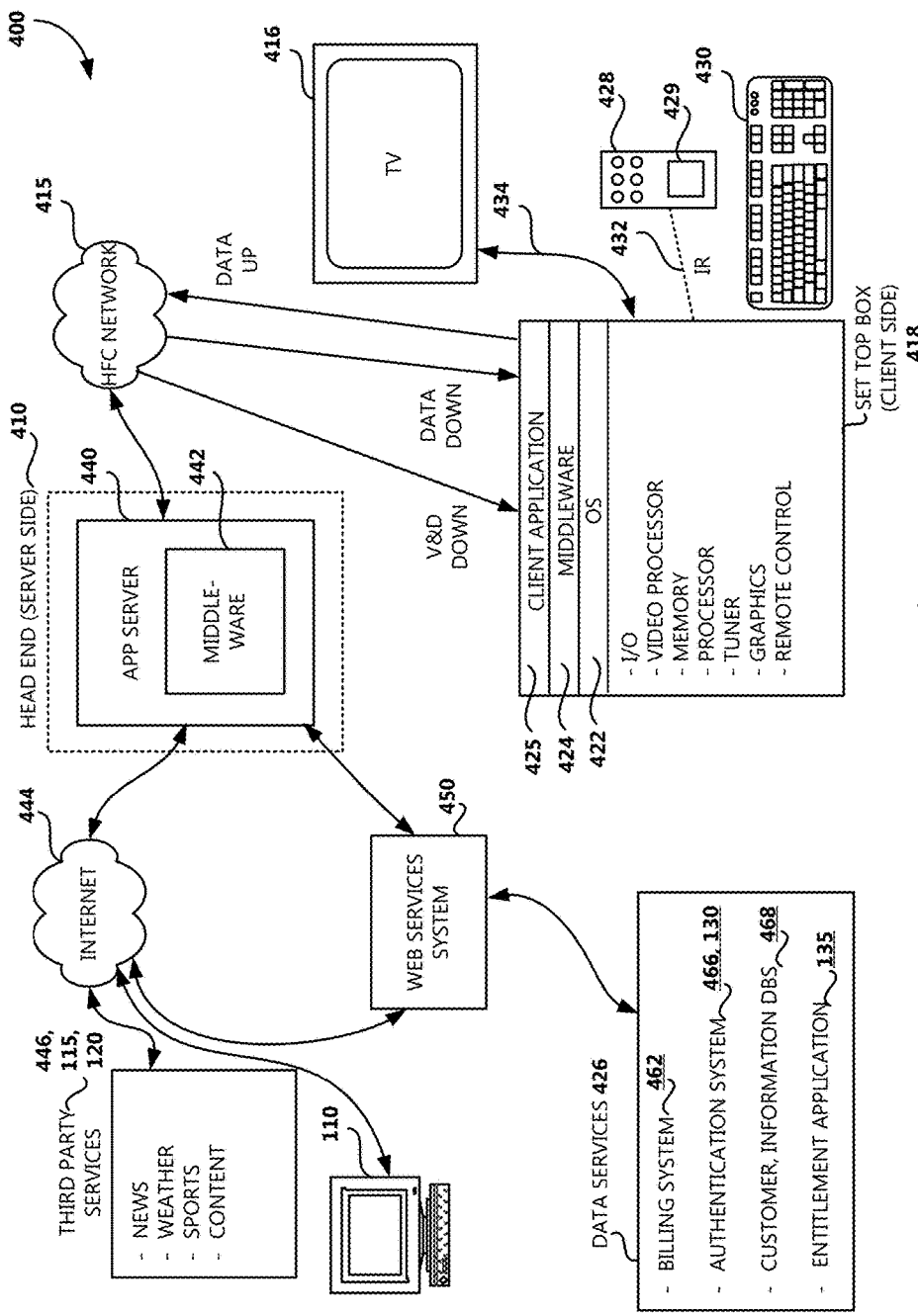
FIG. 4 is a block diagram illustrating components of a cable services system architecture providing an example operating environment according to aspects of the present disclosure.

FIG. 4 is a block diagram illustrating a cable television services system 400 (hereafter referred to as "CATV") architecture providing an operating environment according to an aspect. According to aspects, the content services provider 125 can operate in the form of a CATV 400 as illustrated and described in FIG. 4. As should be appreciated, a CATV services system 400 is but one of various types of systems that can be utilized for providing an operating environment for providing supplemental content functionality described herein. Referring now to FIG. 4, digital and analog video programming, information content and interactive television services are provided via a hybrid fiber coax (HFC) network 415 to a television set 416 for consumption by a cable television/services system customer. As is known to those skilled in the art, HFC networks 415 combine both optical fiber and coaxial cable lines. Typically, optical fiber runs from the cable head end 410 to neighborhoods of subscribers. Coaxial cable runs from the optical fiber feeders to each customer or subscriber. The functionality of the HFC network 415 allows for efficient bidirectional data flow between the set-top box 418 and the application server 440 of the aspect.

The CATV system 400 is in the form of a distributed client-server computing system for providing video and data flow across the HFC network 415 between server-side services providers (e.g., cable television/services providers) via a server-side head end 410 and a client-side customer via a set-top box (STB) 418 functionally connected to a customer receiving device, such as the television set 416. As is understood by those skilled in the art, modern CATV systems 400 can provide a variety of services across the HFC network 415 including traditional digital and analog video programming, telephone services, high speed Internet access, video-on-demand, and services.

On the client side of the CATV system 400, digital and analog video programming and digital and analog data are provided to the customer television set 416 via the STB 418. Interactive television services that allow a customer to input data to the CATV system 400 likewise are provided by the STB 418. As illustrated in FIG. 4, the STB 418 is a multipurpose computing device having a computer processor, memory, and an input/output mechanism. The input/output mechanism receives input from server-side processes via the HFC network 415 and from customers via input devices such as a remote control device 428, keyboard 430, or other computing device, such as a tablet/slate computer, smart phone, etc. The remote control device 428 and the keyboard 430 can communicate with the STB 418 via a suitable communication transport such as the infrared connection 432. The remote control device 428 can include a biometric input module 429. The STB 418 also includes a video processor for processing and providing digital and analog video signaling to the television set 416 via a cable communication transport 434. A multi-channel tuner is provided for processing video and data to and from the STB 418 and the server-side head end system 410, described below.

The STB 418 also includes an operating system 422 for directing the functions of the STB 418 in conjunction with a variety of client applications 425. For example, if a client application 425 requires a news flash from a third-party news source to be displayed on the television 416, the operating system 422 can cause the graphics functionality and video processor of the STB 418, for example, to output the news flash to the television 416 at the direction of the client application 425 responsible for displaying news items.

Because a variety of different operating systems 422 can be utilized by a variety of different brands and types of set-top boxes 418, a middleware layer 424 can be provided to allow a given software application to be executed by a variety of different operating systems. According to an embodiment, the middleware layer 424 can include a set of application programming interfaces (APIs) that are exposed to client applications and operating systems 422 that allow client applications 425 to communicate with the operating systems 422 through common data calls understood via the API set. As described below, a corresponding middleware layer 442 is included on the server side of the CATV system 400 for facilitating communication between the server-side application server and the client-side STB 418. The middleware layer 442 of the server-side application server and the middleware layer 424 of the client-side STB 418 can format data passed between the client side and server side according to the Extensible Markup Language (XML).

According to one aspect, the STB 418 passes digital and analog video and data signaling to the television 416 via a one-way communication transport 434. According to other aspects, two-way communication transports can be utilized, for example, via high definition multimedia (HDMI) ports. The STB 418 can receive video and data from the server side of the CATV system 400 via the HFC network 415 through a video/data downlink and data via a data downlink. The STB 418 can transmit data from the client side of the CATV system 400 to the server side of the CATV system 400 via the HFC network 415 via one data uplink. The video/data downlink is an "in band" downlink that allows for digital and analog video and data signaling from the server side of the CATV system 400 through the HFC network 415 to the STB 418 for use by the STB 418 and for distribution to the television set 416. As is understood by those skilled in the art, the "in band" signaling space operates at a relative high frequency, e.g., between 54 and 1000 megahertz. The signaling space is generally divided into 6 megahertz channels in which can be transmitted as a single analog signal or a greater number (e.g., ten) of digital signals.

The data downlink and the data uplink, illustrated in FIG. 4, between the HFC network 415 and the set-top box 418 comprise "out of band" data links. As is understand by those skilled in the art, the "out of band" frequency range is generally at a lower frequency than "in band" signaling. For example, the "out of band" frequency range can be between zero and 54 megahertz. Data flow between the STB 418 and the server-side application server 440 is typically passed through the "out of band" data links. Alternatively, an "in band" data carousel can be positioned in an "in band" channel into which a data feed can be processed from the application server 440 through the HFC network 415 to the STB 418. Operation of data transport between components of the CATV system 400, described with reference to FIG. 4, is well known to those skilled in the art.

Referring still to FIG. 4, the head end 410 of the CATV system 400 is positioned on the server side of the CATV system and includes hardware and software systems responsible for originating and managing content for distributing through the HFC network 415 to client-side STBs 418 for presentation to customers. As described above, a number of services can be provided by the CATV system 400, including digital and analog video programming, interactive television services, telephone services, video-on-demand services, targeted advertising, and/or provision of supplemental content.

The application server 440 can be configured as a computing system operative to assemble and manage data sent to and received from the STB 418 via the HFC network 415. As described above, the application server 440 includes a middleware layer 442 for processing and preparing data from the head end 410 of the CATV system 400 for receipt and use by the client-side STB 418. For example, the application server 440 via the middleware layer 442 can obtain supplemental content from third-party services 446 via the Internet 444 for transmitting to a customer through the HFC network 415, the STB 418, and recording by a local or remote DVR. For example, content metadata a third-party content provider service can be downloaded by the application server 440 via the Internet 444. When the application server 440 receives the downloaded content metadata, the middleware layer 442 can be utilized to format the content metadata for receipt and use by the STB 418. Therefore, content metadata can be sent and categorized based on the availability to the customer's program guide data.

According to one embodiment, data obtained and managed by the middleware layer 442 of the application server 440 is formatted according to the Extensible Markup Language and is passed to the STB 418 through the HFC network 415 where the XML-formatted data can be utilized by a client application 425 in concert with the middleware layer 424, as described above. As should be appreciated by those skilled in the art, a variety of third-party services data 446, including news data, weather data, sports data and other information content can be obtained by the application server 440 via distributed computing environments such as the Internet 444 for provision to customers via the HFC network 415 and the STB 418. According to aspects the content source 115, the content source application 116 and the third party authentication platform 120 can communicate with the CATV 400 as third party services 446.

According to aspects, the application server 440 obtains customer support services data, including billing data, information on customer work order status, answers to frequently asked questions, services provider contact information, and the like from data services 426 for provision to the customer via an interactive television session. The data services 426 include a number of services operated by the services provider of the CATV system 400 which can include profile and other data associated with a given customer.

A billing system 462 can include information such as a customer's name, street address, business identification number, Social Security number, credit history, and information regarding services and products subscribed to by the customer. According to embodiments, the billing system 462 can also include billing data for services and products subscribed to by the customer for bill processing, billing presentment and payment receipt.

A customer information database 468 can include general information about customers such as place of employment, business address, business telephone number, and demographic information such as age, gender, educational level, and the like. The customer information database 468 can also include information on pending work orders for services or products ordered by the customer. The customer information database 468 can also include general customer information such as answers to frequently asked customer questions and contact information for various service provider offices/departments. As should be understood, this information can be stored in a variety of disparate databases operated by the cable services provider.

According to aspects, the authentication system 466 (e.g., provider authentication platform 130) and the entitlement application 135 can perform the functions of the provider authentication platform 130 and provider entitlement application 135, respectively, as described above with reference to FIG. 1.

Referring still to FIG. 1, web services system 450 is illustrated between the application server 440 and the data services 426. According to aspects, web services system 450 serves as a collection point for data requested from each of the disparate data services systems comprising the data services 426. According to aspects, when the application server 440 requires customer services data from one or more of the data services 426, the application server 440 passes a data query to the web services system 450. The web services system 450 formulates a data query to each of the available data services systems for obtaining any required data for a requesting customer as identified by a set-top box identification associated with the customer.

The web services system 450 serves as an abstraction layer between the various data services systems and the application server 440. That is, the application server 440 is not required to communicate with the disparate data services systems, nor is the application server 440 required to understand the data structures or data types utilized by the disparate data services systems. The web services system 450 is operative to communicate with each of the disparate data services systems for obtaining necessary customer data. The customer data obtained by the web services system is assembled and is returned to the application server 440 for ultimate processing via the middleware layer 442, as described above. An authentication system 466 can include information such as secure user names, subscriber profiles, subscriber IDs, and passwords utilized by customers for access to network services. As should be understood by those skilled in the art, the disparate systems 450, 462, 466, 468 can be integrated or provided in any combination of separate systems, wherein FIG. 4 shows only one example.

Figure 5:
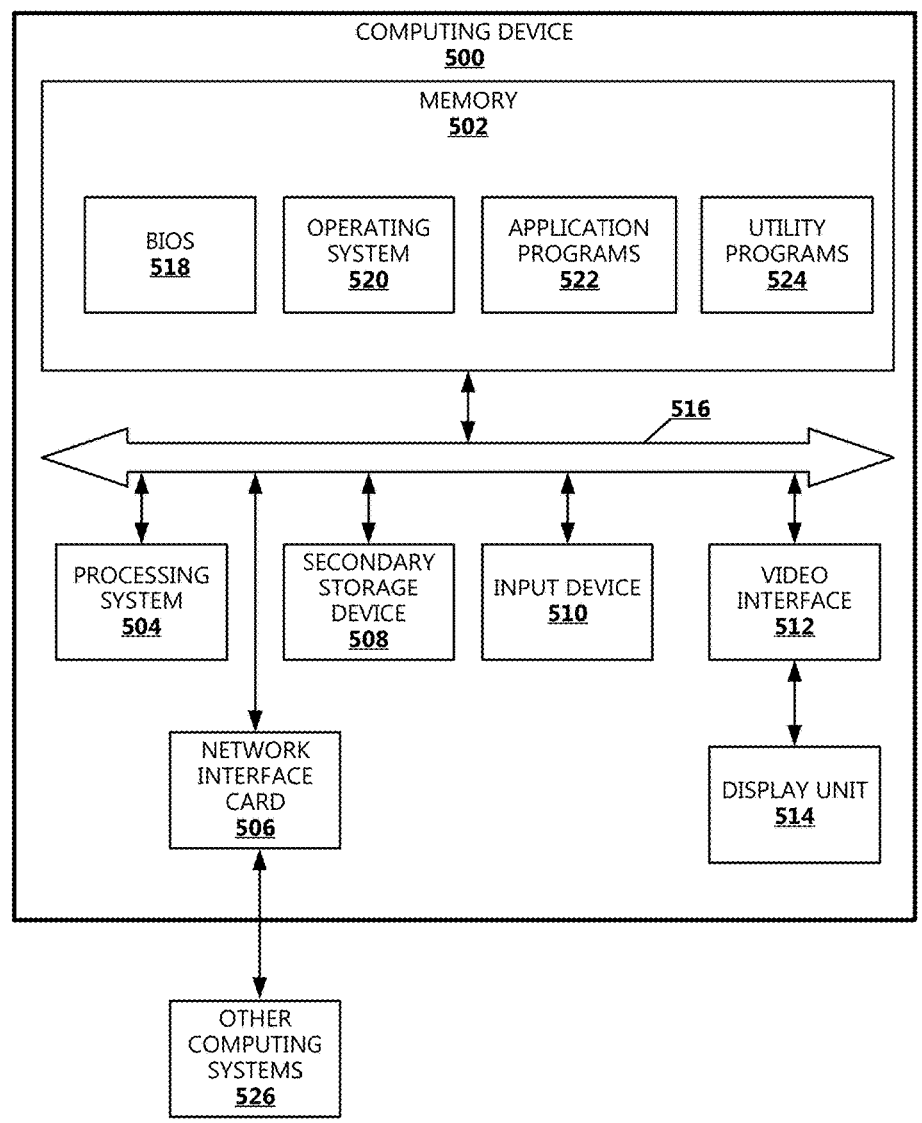
FIG. 5 is a block diagram showing example physical components of a computing device with which aspects of the present disclosure can be practiced.

FIG. 5 is a block diagram illustrating example physical components of a computing device 500 with which examples can be practiced. In some examples, one or a combination of the components of system 100 (FIG. 1) can be implemented using one or more computing devices like the computing device 500. It should be appreciated that in other examples, components of system 100 can be implemented using computing devices having hardware components other than those illustrated in the example of FIG. 5.

Computing devices can be implemented in different ways in different examples. For instance, in the example of FIG. 5, the computing device 500 includes a processing system 504, memory 502, a network interface 506, a secondary storage device 508, an input device 510, a video interface 512, a display unit 514, and a communication medium 516. In other examples, the computing device 500 can be implemented using more or fewer hardware components (e.g., a video interface, a display unit, or an input device) or in combination with other types of computer systems and program modules 526.

The memory 502 includes one or more computer-readable storage media capable of storing data and/or computer-executable instructions. According to one embodiment, the content source application 116 can be stored locally on computing device 500. Memory 502 thus can store the computer-executable instructions that, when executed by processor 504, cause the content source application 116 to allow users to request and access content as described above. According to another embodiment, one or more components of the validation system 102 (e.g., the access information store 104, the access request validation manager 108, and the notification engine 112) can be stored locally on computing device 500, wherein the computing device can be the requesting device 110, a web server device, a third party authentication platform computing device, or a content services provider 125 backend server computing device. Memory 502 thus can store the computer-executable instructions that, when executed by processor 504, cause the one or more components of the validation system to receive an indication of a content access request from a requesting user device 110, obtain location information for the requesting user device, obtain content access attempt frequency information, determine whether one or a combination of the location information and the content access attempt frequency information satisfy predetermined criteria associated with suspicious content access activity, and when a determination is made that a content access attempt is suspicious, initiate a notification communication to the primary account holder user 106 requesting the primary account holder's permission for the allowing the requested content access, receiving a response from the primary account holder that the requested access is either approved or denied, and communicate to the provider authentication platform 130 of the approval or denial such that access to the request content item by the requesting device 110 can be granted or disallowed.

In various examples, the memory 502 is implemented in various ways. For example, the memory 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium can also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 504 includes one or more processing units, which can include tangible integrated circuits that selectively execute computer-executable instructions. In various examples, the processing units in the processing system 504 are implemented in various ways. For example, the processing units in the processing system 504 can be implemented as one or more processing cores. In this example, the processing system 504 can comprise one or more microprocessors. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 can be enabled to send data to and receive data from a communication network via a network interface card 506. In different examples, the network interface card 506 is implemented in different ways, such as an Ethernet interface, a token-ring network interface, a fiber optic network interface, a wireless network interface (e.g., Wi-Fi, Wi-Max, etc.), or another type of network interface. The network interface can allow the device to communicate with other devices, such as over a wireless network in a distributed computing environment, a satellite link, a cellular link, and comparable mechanisms. Other devices can include computer device(s) that execute communication applications, storage servers, and comparable devices.

The secondary storage device 508 includes one or more computer-readable storage media, and can store data and computer-executable instructions not directly accessible by the processing system 504. That is, the processing system 504 performs an I/O operation to retrieve data and/or computer-executable instructions from the secondary storage device 508. In various examples, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different examples, the video interface 512 is implemented in different ways. For example, the video interface 512 is a video expansion card. In another example, the video interface 512 is integrated into a motherboard of the computing device 500. In various examples, the display unit 514 can be a an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 516 facilitates communication among the hardware components of the computing device 500. In different examples, the communications medium 516 facilitates communication among different components of the computing device 500. For instance, in the example of FIG. 5, the communications medium 516 facilitates communication among the memory 502, the processing system 504, the network interface card 506, the secondary storage device 508, the input device 510, and the video interface 512. In different examples, the communications medium 516 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs 522 that, when executed by the processing system 504, cause the computing device 500 to provide applications to users. The content source application 116 is an example of an application program 522. The memory 502 also stores one or more utility programs 524 that, when executed by the processing system 504, cause the computing device 500 to provide utilities to other software programs.

Figures 6A, 6B:
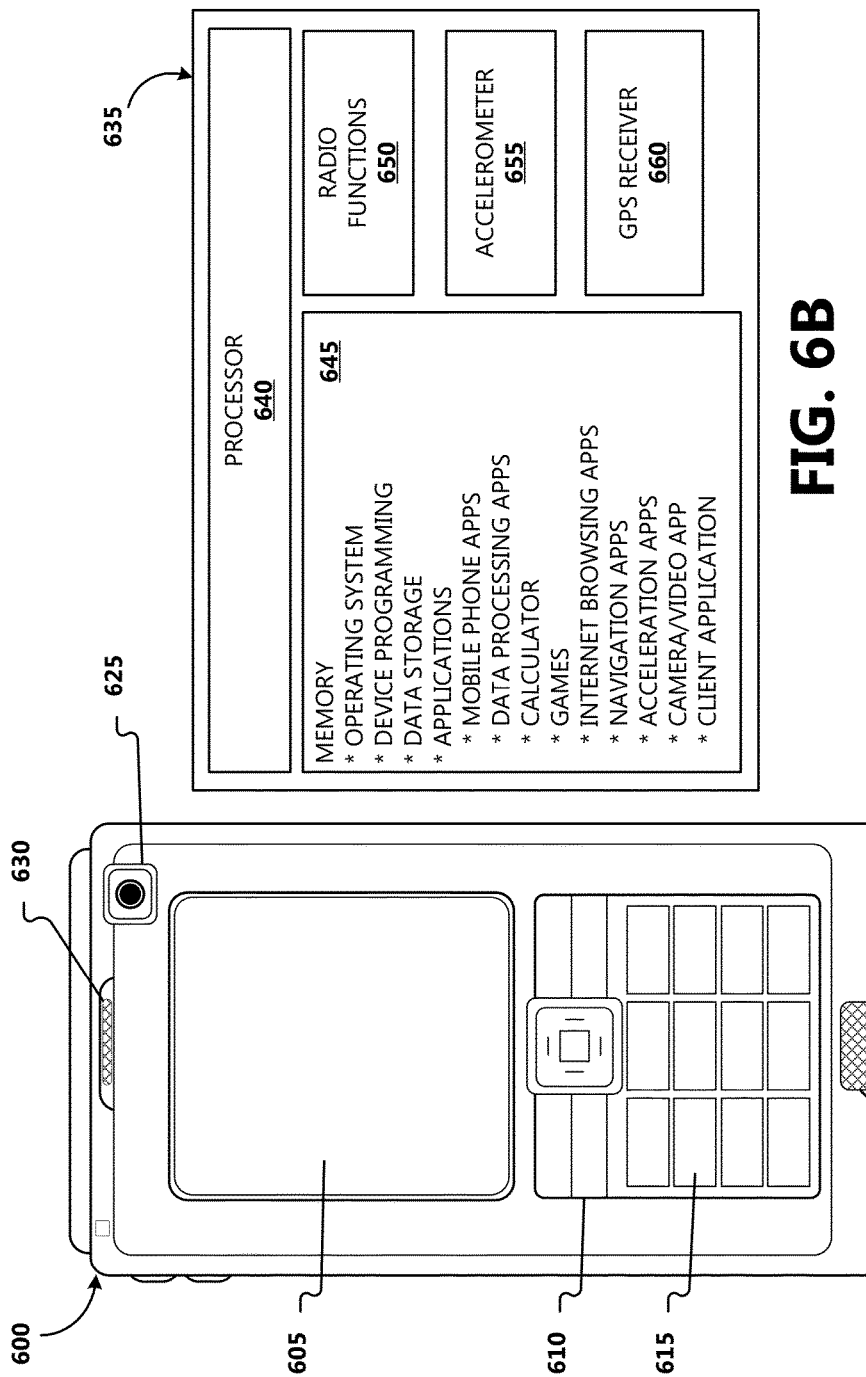
FIGS. 6A and 6B illustrate example physical components of a suitable mobile computing environment with which aspects of the present disclosure can be practiced.

FIGS. 6A-6B illustrate a suitable mobile computing device 600 or environment, for example, a mobile computing device or smart phone, a tablet personal computer, a laptop computer, or other device 110, with which aspects can be practiced. The mobile computing device 600 is illustrative of any suitable device operative to send, receive and process wireless communications. A display screen 605 is operative for displaying a variety of information such as information about incoming and outgoing communications, as well as, a variety of data and displayable objects, for example, text, alphanumeric data, photographs, and the like.

Data input to the mobile computing device 600 can be performed via a variety of suitable means, such as, touch screen input via the display screen 605, keyboard or keypad input via a data entry area 610, key input via one or more selectable buttons or controls 615, voice input via a microphone 618 disposed on the mobile computing device 600, photographic input via a camera 625 functionality associated with the mobile computing device 600, or any other suitable input means. Data can be output via the mobile computing device 600 via any suitable output means, including but not limited to, display on the display screen 605, audible output via an associated speaker 630 or connected earphone system, vibration module for providing tactile output, and the like.

Referring now to FIG. 6B, operational unit 635 is illustrative of internal operating functionality of the mobile computing device 600. A processor 640 is illustrative of a computer processor for processing incoming and outgoing data and communications and controlling operation of the device and associated software applications via a mobile computing device operating system. Memory 645 can be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, the content source application 116 can be stored locally on mobile computing device 600.

Mobile computing device 600 can contain an accelerometer 655 for detecting acceleration, and can be used to sense orientation, vibration, and/or shock. Mobile computing device 600 can contain a global positioning system (GPS) system (e.g., GPS send/receive functionality) 660. A GPS system 660 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 650 include all required functionality, including onboard antennae, for allowing the mobile computing device 600 to communicate with other communication devices and systems via a wireless network. Radio functions 650 can be utilized to communicate with a wireless or WIFI-based positioning system to determine a device location.

Although described herein in combination with mobile computing device 600, in alternative examples, aspects can be used in combination with any number of computer systems, such as in desktop environments, laptop or notebook computer systems, multiprocessor systems, microprocessor based or programmable consumer electronics, networked PCs, mini computers, main frame computers and the like. Embodiments can be utilized in various distributed computing environments where tasks are performed by remote processing devices that are linked through a communications network in a distributed computing environment, and where programs can be located in both local and remote memory storage.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved. While certain aspects have been described, other aspects can exist. Furthermore, although aspects have been described as being associated with data stored in memory and other storage mediums, data can also be stored on or read from other types of computer-readable storage media. Further, the disclosed processes can be modified in any manner, including by reordering and/or inserting or deleting a step or process, without departing from the aspects. The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

I claim:

1. A system for securing access to content provided over a distributed network, the system comprising:
   at least one processor;
   a memory storage storing instructions that, when executed by the at least one processor, provide:
      an access request validation manager to:
         receive an indication of a current content access request from a content source application for access to a content item via the content source application operating on a requesting user device, wherein access to the content item is provided by a content services provider and the current content access request is associated with an account with the content services provider;
         obtain, from the content source application, location information for the requesting user device in association with the current content access request;
         retrieve, from an access information store, location information for past content access requests associated with the account and content access attempt frequency information associated with the past content access requests; and
         determine, based on the location information for the requesting user device in association with the current content access request, the location information for past content access requests associated with the account, and the content access attempt frequency information associated with the past content access requests, whether the current content access request is suspicious according to a threshold associated with content access requests from an out-of-market location for the content services provider; and
      a notification engine to:
         transmit a notification communication via a communication channel to a primary account holder having an account with the content services provider when a determination is made by the access request validation manager that the current content access request is suspicious according to the threshold and based on the location information of the requesting user device in association with the current content access request, the location information for past content access requests associated with the account, and the content access attempt frequency information associated with the past content access requests, the notification comprising a request for permission by the primary account holder for allowing access to the content item via the content source application operating on the requesting user device; and receive a response from the primary account holder:
when the response indicates that the primary account holder gives the permission for the requested access, output an instruction to the content source application to enable access to the content item via the content source application operating on the requesting user device; and when the response indicates that the primary account holder denies the requested access, output an instruction to the content source application to deny access to the content item via the content source application operating on the requesting user device, and thus restrict unauthorized access to the content item.

2. The system of claim 1, wherein the determination that the current content access request is suspicious is based on a determination of whether characteristics of the current content access request satisfy predetermined criteria associated with suspicious content access activity.

3. The system of claim 2, wherein the predetermined criteria associated with suspicious content access activity comprise one or a combination of:
location information indicative of a location not associated with or serviced by the content services provider;
content access attempt frequency information indicating a number of content access attempts satisfying a threshold of access attempts from an identified location; and
content access attempt frequency information indicating a number satisfying a threshold of access attempts within a predetermined time period.

4. The system of claim 1, wherein in obtaining location information for the requesting user device in association with the current content access request, the access request validation manager is further operative to:
increment a count associated with access attempts from the requesting user device; and
store the incremented count in the access information store.

5. The system of claim 1, wherein the content source application is associated with a content source, the content source including one of:
a sports service;
a news service;
a weather service; and
an entertainment-oriented content provider.

6. The system of claim 5, wherein the content services provider includes:
a cable services provider;
a satellite services provider; or
the content source.

7. The system of claim 1, wherein prior to transmitting the notification communication to the primary account holder, the system is further operative to:
perform an entitlement check for the requested access to the content item; and determine that the requested access to the content item is entitled based on the entitlement check.

8. The system of claim 1, wherein in outputting the instruction to the content source application to enable access to the content item, the system is operative to provide a time-to-live notification defining an authentication duration for the requested access.

9. The system of claim 1, wherein in receiving the response indicating that the primary account holder denies the requested access, the system is operative to:
receive a message of a user-selected denial; or
receive a non-response by the primary account holder within a predetermined grace period.

10. A method for securing access to content provided over a distributed network, comprising:
receiving an indication of a current content access request from a content source application for access to a content item via the content source application operating on a requesting user device, wherein access to the content item is provided by a content services provider and the content access request is associated with an account with the content services provider;
obtaining, from the content source application, location information for the requesting user device in association with the current content access request;
retrieving, from an access information store, location information for past content access requests associated with the account and content access attempt frequency information associated with the past content access requests;
making a determination, based on the location information for the requesting user device in association with the current content access request, the location information for past content access requests associated with the account, and the content access attempt frequency information associated with the past content access requests, whether the current content access request is suspicious according to a threshold associated with content access requests from an out-of-market location for the content services provider;
when a determination is made by an access request validation manager that the current content access request is suspicious according to the threshold and based on the location information of the requesting user device in association with the current content access request, the location information for past content access requests associated with the account, and content access attempt frequency information associated with the past content access requests, transmitting a notification communication via a communication channel to a primary account holder of the account associated with the current content access request, the notification comprising a request for permission by the primary account holder for allowing access to the content item via the content source application operating on the requesting user device; and
receiving a response from the primary account holder;
when the response indicates that the primary account holder gives the permission for the requested access, outputting an instruction to the content source application to enable access to the content item via the content source application operating on the requesting user device; and
when the response indicates that the primary account holder denies the requested access, outputting an instruction to the content source application to deny access to the content item via the content source application operating on the requesting user device, and thus restrict unauthorized access to the content item.

11. The method of claim 10, wherein making the determination that the current content access request is suspicious comprises making the determination based on a determination as to whether characteristics of the current content access request satisfy predetermined criteria associated with suspicious content access activity, the predetermined criteria associated with suspicious content access activity comprising one or a combination of:
  location information indicative of a location not associated with or serviced by the content services provider;
  content access attempt frequency information indicating a number of content access attempts satisfying a threshold of access attempts from an identified location; and
  content access attempt frequency information indicating a number satisfying a threshold of access attempts within a predetermined time period.

12. The method of claim 10, subsequent to obtaining location information for the requesting user device in association with the current content access request:
  incrementing a count associated with access attempts from the requesting user device; and
  storing the incremented count in the access information store.

13. The method of claim 10, wherein prior to transmitting the notification communication to the primary account holder:
  performing an entitlement check for the requested access to the content item; and
  determining that the requested access to the content item is entitled based on the entitlement check.

14. The method of claim 10, wherein outputting the instruction to the content source application to enable access to the content item comprises providing a time-to-live notification defining an authentication duration for the requested access.

15. The method of claim 10, wherein receiving the response indicating that the primary account holder denies the requested access comprises:
  receiving a message of a user-selected denial; or
  receiving a non-response by the primary account holder within a predetermined grace period.

16. A method for securing access to content provided over a distributed network, the method comprising:
  responsive to receiving a request from a requesting user device for access to a content item, collecting login credentials for an account with a content services provider providing access to the content item and location information for the requesting user device;
  transmitting the login credentials to an authentication platform associated with the content services provider for performing an authentication check and entitlement check for the requested access;
  receiving a response from the authentication platform indicating that the requested access is authenticated and entitled;
  transmitting the location information of the requesting user device to a validation system for determining, based on the location information of the requesting user device, location information for past content access requests associated with the account, and stored access attempt frequency information with past content access requests, whether the requested access is suspicious according to a threshold associated with content access requests from an out-of-market location for the content services provider;
  when a determination is made that the requested access is suspicious according to the threshold and based on the location information of the requesting user device, location information for past content access requests associated with the account, and stored access attempt frequency information with past content access requests, receiving an instruction from the validation system indicating whether access to the requested content item is approved based on a response from a primary account holder associated with the account with the content services provider or whether access to the requested content item is denied based on the response from the primary account holder; and
  allowing or denying access to the content item based on the instruction.

17. The method of claim 16, wherein determining that the requested access is suspicious is based on determining whether characteristics of the requested access request satisfy predetermined criteria associated with suspicious content access activity, the predetermined criteria associated with suspicious content access activity comprising one or a combination of:
  location information indicative of a location not associated with or serviced by the content services provider;
  content access attempt frequency information indicating a number of content access attempts satisfying a threshold of access attempts from an identified location; and
  content access attempt frequency information indicating a number satisfying a threshold of access attempts within a predetermined time period.

18. The method of claim 16, wherein receiving the instruction from the validation system comprises receiving a time-to-live notification defining an authentication duration for the requested access.

19. The method of claim 18, further comprising allowing the requested access for the authentication duration defined by the time-to-live information.

20. The method of claim 16, wherein collecting location information for the requesting user device comprises obtaining location information obtained from one or a combination of location information sources associated with the requesting user device, the one or combination of location information sources comprising:
  an Internet protocol (IP) address of the requesting user device;
  a global positioning system (GPS) chip;
  a geolocation application utilizing cell towers to triangulate an approximate position of the requesting user device; and
  a wireless access point or other Internet services access point.

* * * * *